(12) United States Patent
Yoo

(10) Patent No.: US 6,478,711 B2
(45) Date of Patent: Nov. 12, 2002

(54) APPARATUS FOR CHANGING SPEED OF BICYCLES

(75) Inventor: Moon-Soo Yoo, Chungcheongbuk-do (KR)

(73) Assignee: World Industry Co., Ltd. (KR)

( * ) Notice: Subject to any disclaimer, the term of this patent is extended or adjusted under 35 U.S.C. 154(b) by 0 days.

(21) Appl. No.: 09/735,770

(22) Filed: Dec. 13, 2000

(65) Prior Publication Data

US 2001/0019982 A1 Sep. 6, 2001

(30) Foreign Application Priority Data

Dec. 15, 1999 (KR) ............................................. 99-57970

(51) Int. Cl.[7] .............................................. B62M 11/16
(52) U.S. Cl. ....................................... 475/289; 475/340
(58) Field of Search ................................. 475/288, 289, 475/339, 340, 312, 297

(56) References Cited

U.S. PATENT DOCUMENTS

| | | | | |
|---|---|---|---|---|
| 4,838,122 A | * | 6/1989 | Takamiya et al. | 475/289 |
| 5,273,500 A | * | 12/1993 | Nagano | 475/296 |
| 5,785,625 A | * | 7/1998 | Matsuo et al. | 192/41 R |
| 5,855,530 A | * | 1/1999 | Huang et al. | 475/288 |
| 6,048,287 A | * | 4/2000 | Rohloff | 475/289 |
| 6,258,005 B1 | * | 7/2001 | Rohloff | 475/277 |

* cited by examiner

Primary Examiner—Ankur Parekh
(74) Attorney, Agent, or Firm—Stephen J. Koundakjian; Charles W. Fallow

(57) ABSTRACT

An apparatus for changing the speed of bicycles, more particularly, an apparatus that changes the speed of bicycles using inner gears within a rear wheel hub and controls the inner gears by means of controllers mounted on a hub shaft. The apparatus includes: a driven sprocket receiving the driving force of a driving sprocket; a speed controlling portion, which includes a carrier that is fixed to one side of the driven sprocket, containing a plurality of planetary gears with ratchet-teeth formed along their inner circumferences; at least two sun gears for engaging each step of the planetary gears at their ratchet-teeth; a ring gear engaging the other side of the planetary gears; an output portion, including a hub shell transferring the driving force to the rear wheel by means of the carrier and the ring gear; a clutch means mounted between the carrier and the hub shell, and the ring gear and the hub shell, which selectively mediates the driving force; and a speed-change controlling portion. The speed-change controlling portion includes: a hub shaft having a pawl-positioning portion; at least two sets of pawls which engage with or release from the ratchet-teeth of the two or more sun gears; a pawl-controlling ring that controls the position of the two or more sets of pawls; a transforming disk having a groove along its outer circumference with a hooking portion at a certain position thereon, in order to transform the position of the pawl-controlling ring via a mediating portion; a spring for restoring the position of the transforming disk to its original position; and a spacing portion enabling the transforming disk to rotate freely.

15 Claims, 13 Drawing Sheets

APPARATUS FOR CHANGING SPEED OF BICYCLES

BACKGROUND OF THE INVENTION

1. Technical Field

The present invention relates to an apparatus for changing the speed of bicycles and other vehicles using sprockets and chains. More particularly, the invention is a transmission apparatus for changing the speed of such vehicles using inner gears within a rear wheel hub and controlling the inner gears with controllers mounted on a hub shaft, so that the bicycle or other vehicle has a good appearance, changing speed is convenient, the effect occurs immediately after a speed-changing operation, little noise occurs when changing speed, and the number of speed level steps may easily be increased.

2. Background Art

In general, the apparatus for changing speed (i.e., the transmission) is installed on a bicycle. However, in some cases, the transmission may be installed on wheelchairs and toy cars using pedals.

In a conventional bicycle transmission, sprockets having differing diameters, are mounted, respectively, on the side of the middle frame and rear wheel, and a chain connects the front and rear sprockets. The speed is changed by changing the coupling of the sprockets.

But the conventional bicycle transmission has a few drawbacks in that it is too bulky because of the many large sprockets, and noise and impacts occur when changing speed.

As a means of overcoming these drawbacks, an inner gear-type transmission may be installed in the rear wheel hub. In such an inner gear-type transmission, small gears and a controlling means are disposed in a hub shell, so that the bicycle speed is changed by changing the gear tooth ratio thereof.

Illustrative of an inner gear-type transmission is Japanese laid open patent publication No. Hei7-10069, which discloses an inner-gear type transmission hub for bicycles.

The prior art inner gear-type transmission, as shown in FIG. 1, comprises a speed changing portion 10, composed of a hub shaft 6, a driving body 2, a freely rotatable hub 1, at least two sun gears 12, 13 engaging at least two tooth portions 11a, 11b, and a speed-change controlling portion 20. The latter controls the speed-changing portion 10 by transforming the rotational state of the sun gears. The speed-changing portion is composed of a one-directional driving means 7 that is installed between the driving body 2 and the hub 1, enabling the hub 1 to rotate over the driving body 2. A ring-gear portion 1c is fixed to the hub 1 engaging planetary gears 11.

The transmission can change the bicycle speed into three states: a low speed state, in which the driving force of the driving body 2 is transferred to the hub 1 via the one-directional driving means 7 by controlling of the speed-change controlling portion 20; and at least two high speed-states, in which the driving force of the driving body 2 is transferred to the ring-gear portion 1c via the planetary gears 11, resulting in a speed increase.

In other words, when it is in the low speed state, the driving force of the driving body 2 is transferred directly to the hub 1 by the one-directional driving means 7. However, when the rider controls the speed-change controlling portion 20, one of the sun gears 12, 13 is fixed selectively. The driving body 2 is rotating, in this state, the ring-gear portion 1c rotating by planetary gears 11 engaging the selectively fixed sun gear.

In this case, the speed is controlled by the tooth ratio among the fixed sun gear, the planetary gears 11 and ring-gear portion 1c. Because the fixed sun gear has many more teeth than the planetary gears 11, the speed of the planetary gears 11 revolving around the fixed sun gear exceeds the speed of one-directional driving means 7, thus yielding the high speed state.

As shown in FIGS. 2A to 2C, the prior art speed-change controlling portion 20 is operated by pawls 12a, 13a mounted on the side of the sun gears 12, 13, with a protrusion for fixing gears 6a, and a controlling sleeve 21. Each step of changing speed is operated by using the pawls 12a, 13a to fix the sun gears to the controlling sleeve 21 or to release the sun gears from the pawls 12a, 13a.

In the low speed state, as shown in FIG. 2A, the two pawls 12a, 13a are released from the controlling sleeve 21 by the protrusions of the fixing gears 6a. But in the first high speed state, as shown in FIG. 2B, because one pawl 12a is fastened to the controlling sleeve 21, one sun gear 13 is rotatable. So the larger diameter portion of the planetary gears 11 engages the fixed sun gear 12.

On the other hand, when the other pawl 13a is fastened to the controlling sleeve 21, the other sun gear 12 is rotatable, so that the smaller diameter portion of the planetary gears 11 engages the fixed sun gear 13, as shown in FIG. 2C. This is the second high speed state.

However, in a speed control apparatus as described above, because the two pawls 12a, 13a are installed opposite one another, there is a drawback: When a rider operates a lever in order to change the speed of the bicycle, the effect of this operation is delayed until one of the pawls 12a, 13a is activated. Typically, the effect of the operation occurs only after the wheel makes a half revolution.

While the above drawback could be resolved somewhat by providing more pawls, this would necessitate changing the shape of the controlling sleeve 21. But because it would also be necessary to change the shape of the protrusions of the fixing gears 6a, the number of pawls could not easily be increased.

Even when the pawls are not in operation, friction always occurs between the pawls 12a, 13a and the controlling sleeve 21. This friction causes noise and abrasion, which is also a negative factor.

Moreover, if more speed change steps are offered by providing more planetary gears, the above drawbacks become more serious.

BRIEF SUMMARY OF THE INVENTION

It is an object of the present invention to provide an apparatus for changing the speed of bicycles, which changes speed by using inner gears inside a rear wheel hub and controlling the inner gears with controllers mounted on a hub shaft. Accordingly, the bicycle has a good appearance, changing speed is convenient, the effect of the speed change operation occurs immediately, little noise occurs during the operation, and additional speed level steps may easily be provided.

According to the above object, there is provided an apparatus for changing the speed of bicycles, comprising: a driven sprocket receiving the driving force of a driving sprocket; a speed controlling portion, comprising a carrier fixed to one side of the driven sprocket, containing a plurality of planetary gears having ratchet-teeth formed along their inner circumferences; at least two sun gears engaging each step of the planetary gears; a ring gear engaging the other sides of the planetary gears; an output portion, comprising a hub shell transferring the driving force to the rear wheel by means of the carrier and the ring gear; a clutch means, mounted between the carrier and hub shell, and the ring gear and the hub shell, which selectively mediates the driving force; and a speed-change controlling portion.

The latter comprises a hub shaft having a pawl-positioning portion; at least two sets of pawls engaging with or releasing from the ratchet-teeth of the two or more sun gears; a pawl-controlling ring controlling the position of the two or more sets of pawls; a transforming disk having a groove along its outer circumference with a hooking portion formed at a certain position thereon, in order to transform the position of the pawl-controlling ring via a mediating portion; a spring for restoring the position of the transforming disk to its original position; and a spacing portion enabling the transforming disk to rotate freely.

DETAILED DESCRIPTION OF THE PREFERRED EMBODIMENTS

Figure 1:
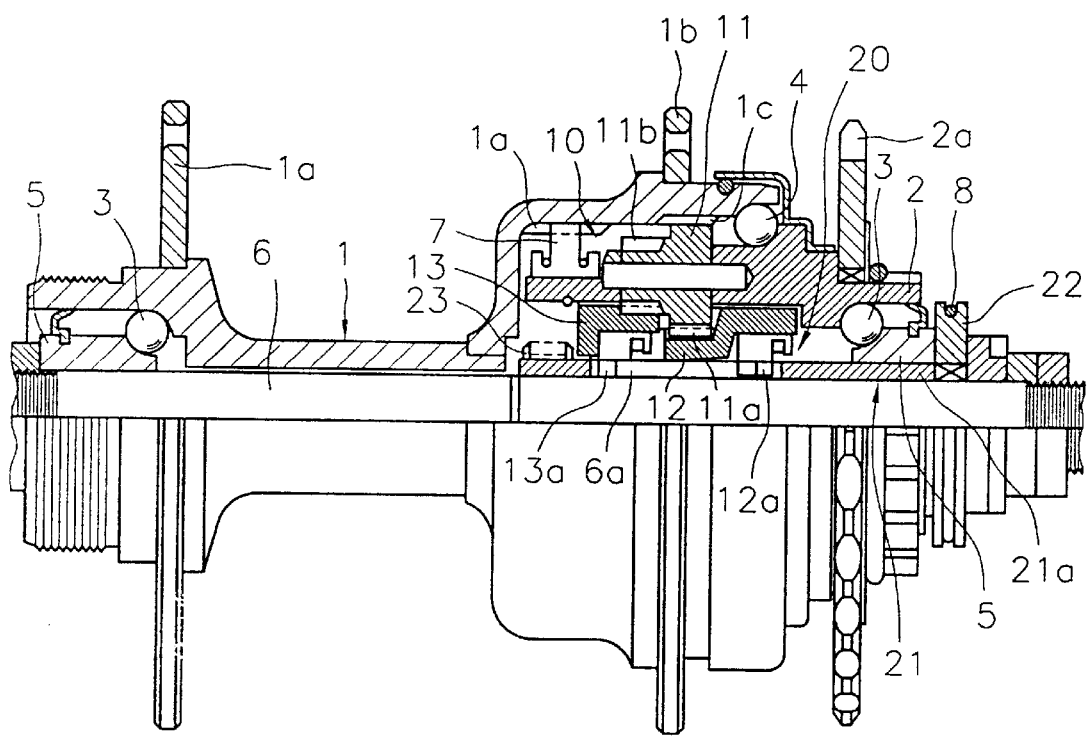
FIG. 1 is a partial sectional view showing a transmission hub for bicycles of the prior art.
Figure 2A:
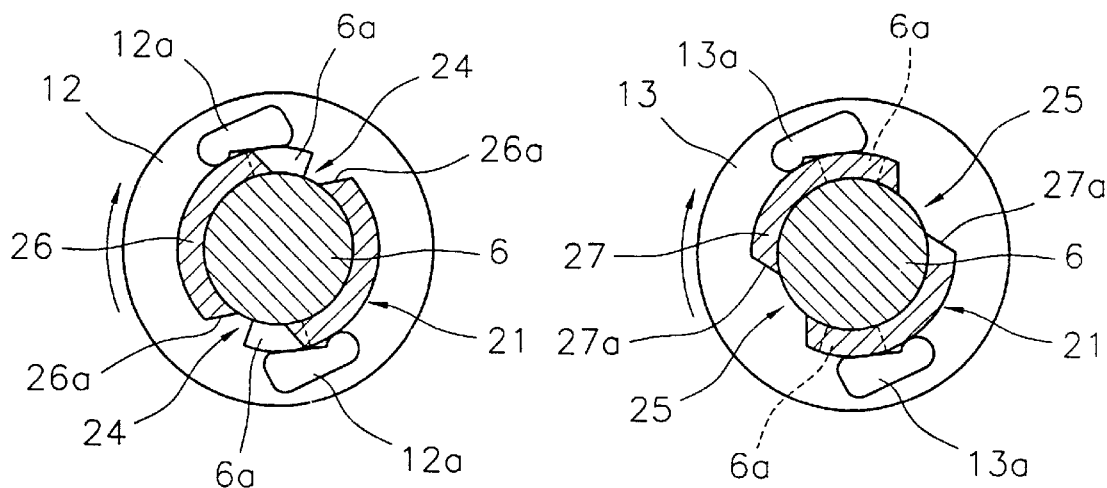
FIGS. 2A to 2C are schematic views of a speed-change controlling portion in each speed step of a transmission hub for bicycles of the prior art.
Figure 2B:
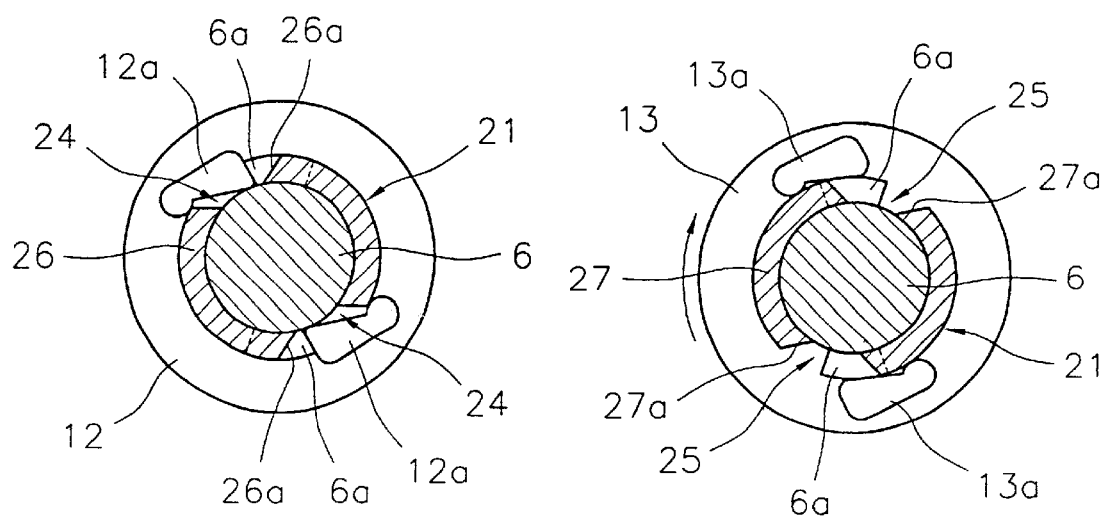
Figure 2C:
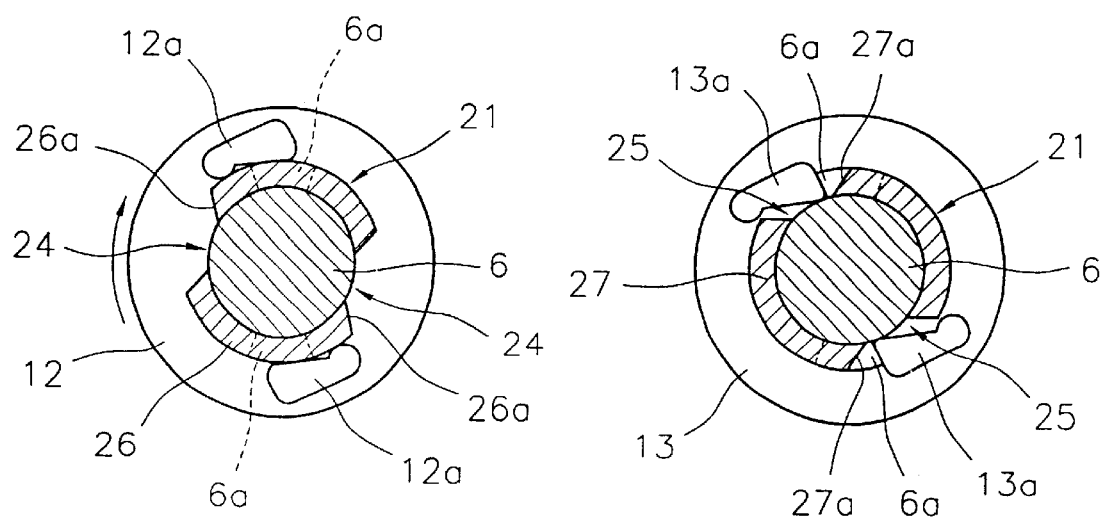
Figure 3:
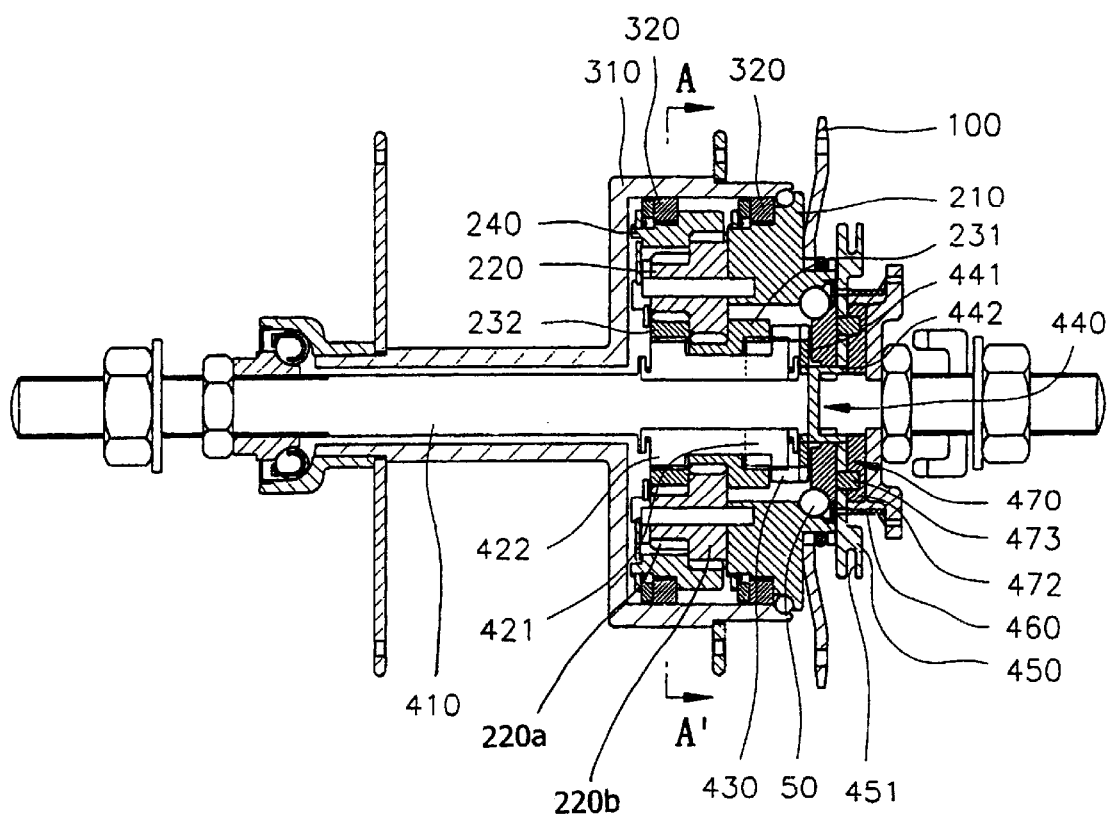
FIG. 3 is a sectional view of the speed changing apparatus of the present invention.
Figure 4:
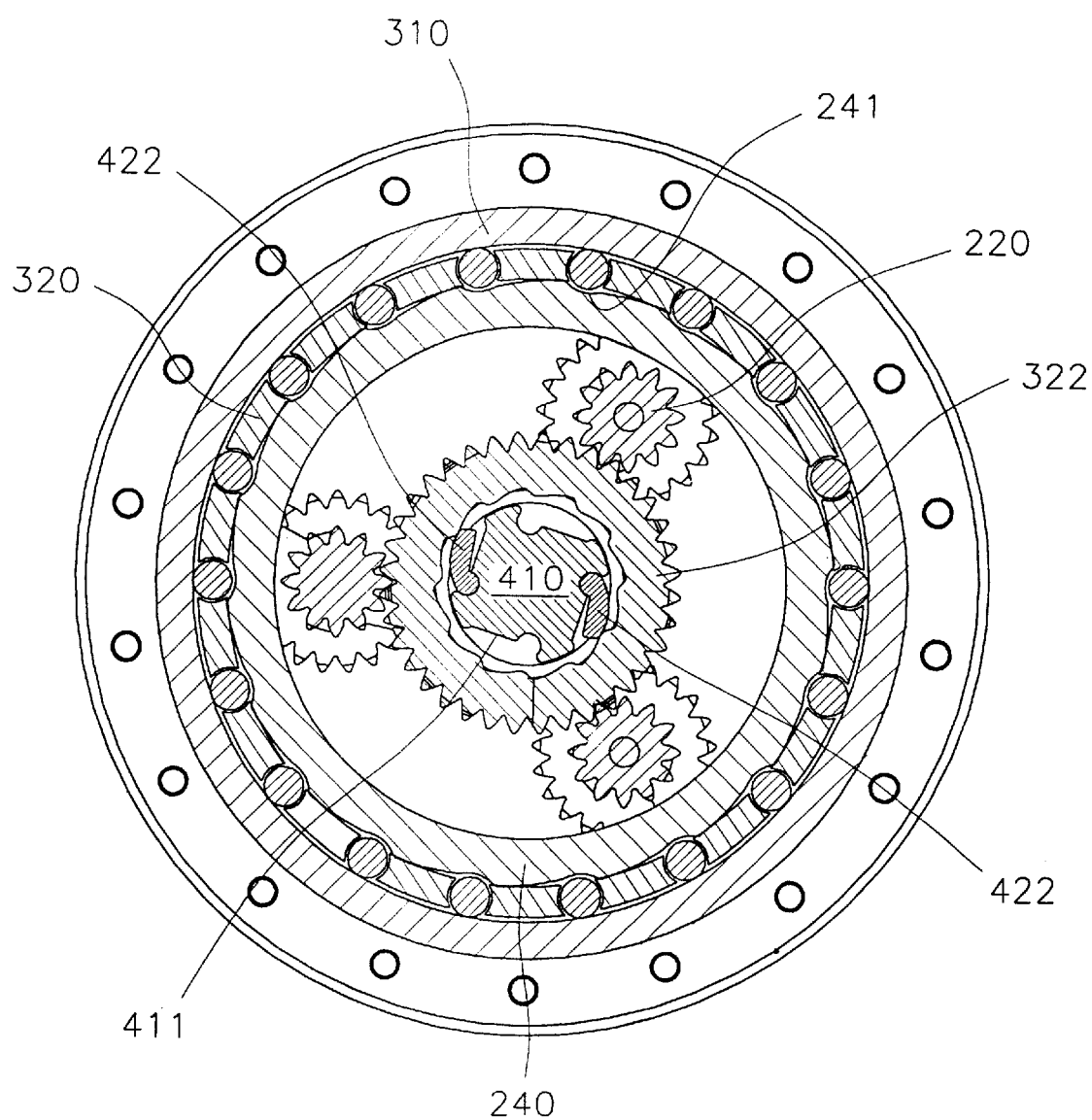
FIG. 4 is a sectional view along A–A' of FIG. 3.

As shown in FIGS. 3 and 4, the present apparatus for changing the speed of bicycles comprises, principally, a driven sprocket 100 receiving the driving force of a driving sprocket (not shown), a speed controlling portion, an output portion, and a speed-change controlling portion.

The speed controlling portion comprises a carrier 210 that is fixed to one side of the driven sprocket 100, a plurality of installed planetary gears 220, at least two sun gears 231, 232 engaging at least two tooth portions 220a, 220b of the planetary gears 220, having ratchet-teeth 231a, 232a formed along their inner circumferences, and a ring gear 240 engaging with the other sides of the planetary gears 220.

The output portion comprises a hub shell 310, which transfers the driving force to the rear wheel by means of the carrier 210 and the ring gear 240; and a clutch means 320, mounted between the carrier 210 and the hub shell 310, and the ring gear 240 and the hub shell, that selectively mediates the driving force.

The speed-change controlling portion comprises a hub shaft 410 having a pawl-positioning portion 411; at least two set of pawls 421, 422 engaging with or releasing from the ratchet-teeth 231a, 232a of the two or more sun gears 231, 232; a pawl-controlling ring 430 controlling the position of the two or more sets of pawls 421, 422; a transforming disk 450 having a groove 451 along its outer circumference and a hooking portion 452 at a certain position thereon, in order to transform the position of the pawl-controlling ring 430 via a mediating portion 440; a spring 460 for restoring the position of the transforming disk 450 to its original position; and a spacing portion 470 enabling the transforming disk 450 to rotate freely.

In this embodiment, the clutching means 320 comprises a clutch ring in which a group of pins is positioned, and a sloping portion 241 formed on the outer surface of the carrier 210 and the ring gear 240. Thus, the carrier 210 (or the ring gear 240) and the hub shell 310 rotate, as a single body, being fixed by the relative displacement of the clutch ring.

Under certain circumstances, ratchet-teeth and pawls can replace the clutch ring and the sloping portion 241.

Figure 5:
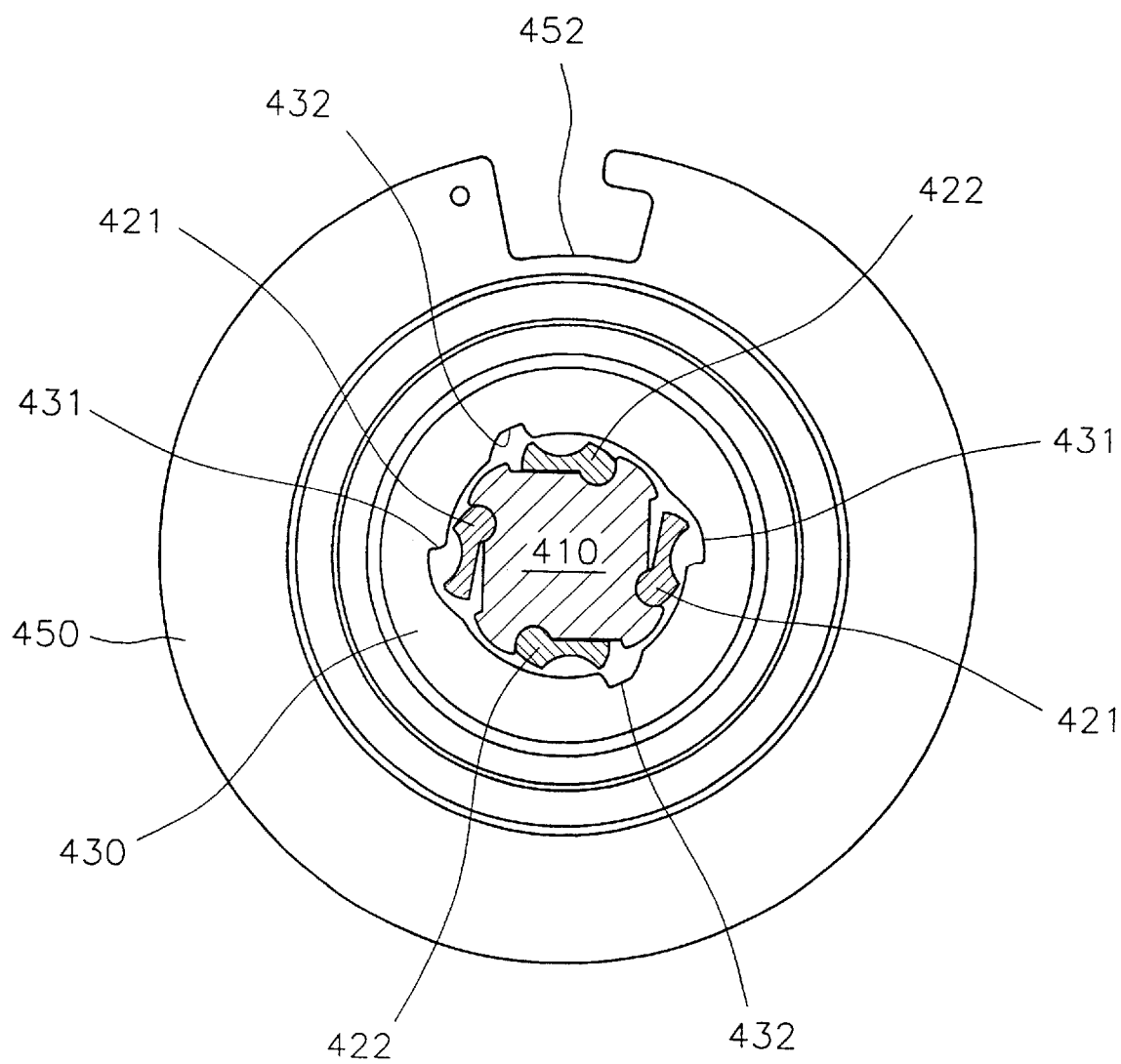
FIG. 5 is a sectional view of the speed-change controlling portion of the present invention.
Figure 6:
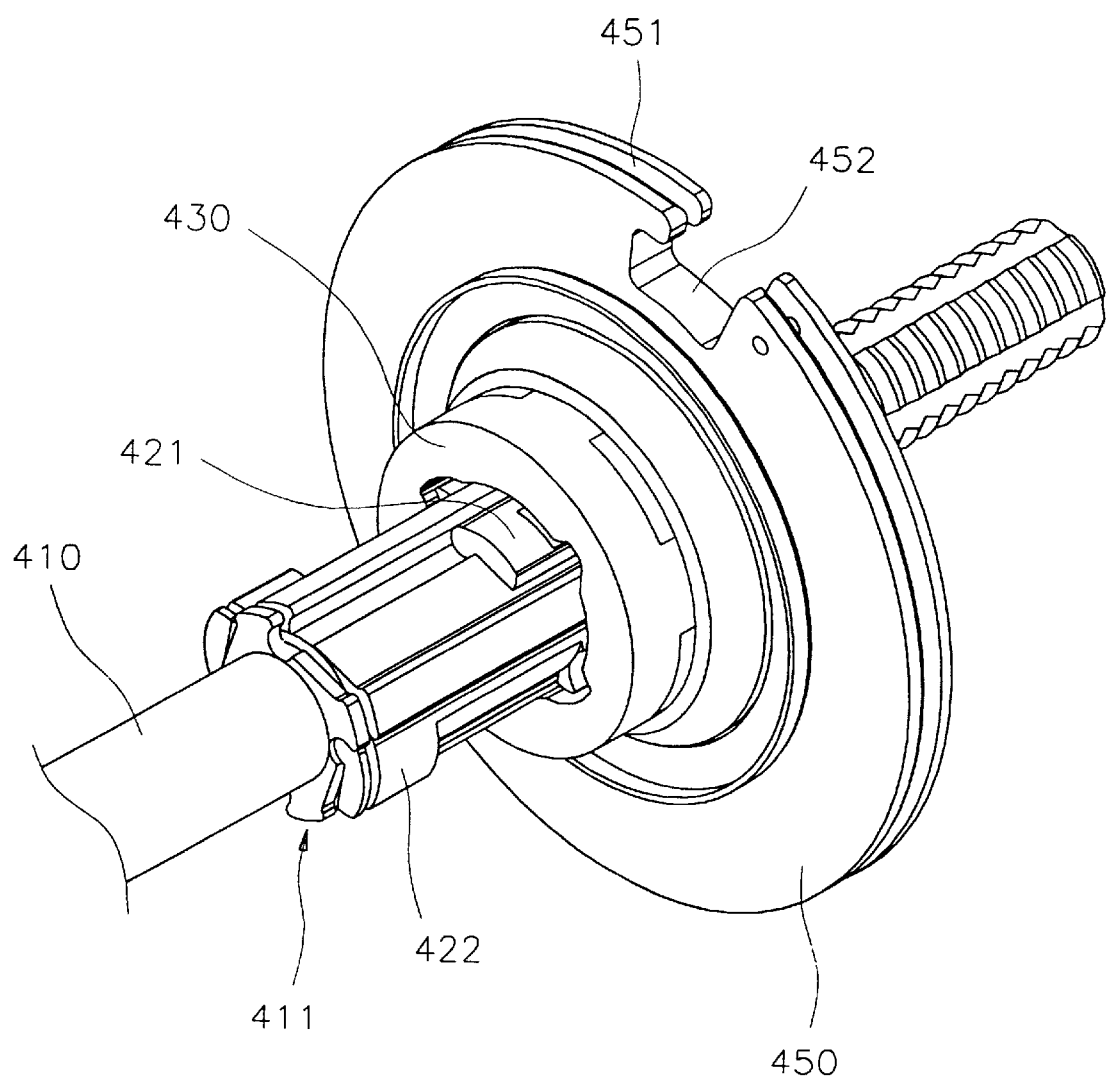
FIG. 6 is a perspective view of the speed-change controlling portion of the present invention.

As shown in FIGS. 5 and 6, on the inner surface of the pawl-controlling ring 430, grooves are formed symmetrically with respect to the center point in order to control the position of the pawls 421, 422.

The grooves consist of a pair of sloping grooves 431 and a pair of angular grooves 432. The sloping grooves 431 and the angular grooves 432 are formed alternatively on the inner surface of the pawl-controlling ring 430.

While the grooves are not formed at the same intervals, the pawls 421, 422 are mounted in the pawl-positioning portion 411 at the same intervals, so that only one set of pawls is controlled selectively and smoothly.

Figure 7:
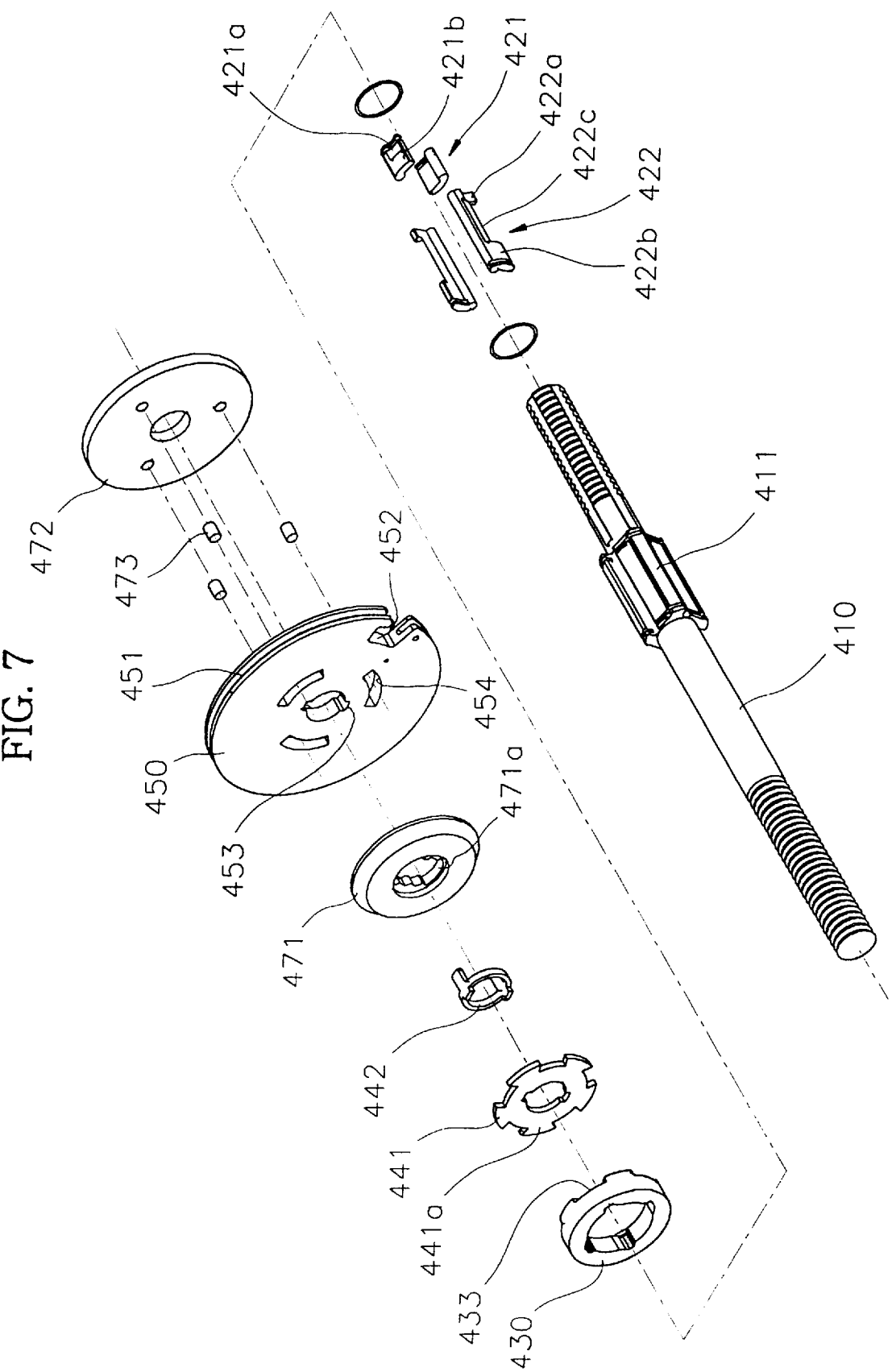
FIG. 7 is an exploded perspective view of the speed-change controlling portion of the present invention.

As shown in FIG. 7, the pawls 421, 422 comprise a sag portion 421a, 422a positioned inside the pawl-controlling ring 430 and a stopper portion 421b, 422b engaging with or releasing from the ratchet-teeth 231a, 232a, which are formed along the inner circumferences of the sun gears 231, 232.

The pawl 422, which is positioned relatively far from the pawl-controlling ring 430, further comprises an extended portion 422c that is thinner than the pawl body, so that it prevents the pawl 422 from engaging other elements.

Hereinafter, for convenience, the pawl 421 will denote a first pawl that engages the sun gear 231 (the latter denoted as a first sun gear), which is near the pawl-controlling ring 430. Pawl 422 will denote a second pawl that engages the sun gear 232 (denoted as a second sun gear).

As shown perhaps more clearly in FIG. 7, the mediating portion 440 comprises a splined groove 433 that is formed on one side of the pawl-controlling ring 430, a connecting portion 441a engaging the splined groove 433 by means of the coupling tongue 441 formed therein, and a pork ring 442 that is installed in the central grooves of the connecting portion 441, mediating the rotational force by engaging a splined portion 453 formed in the transforming disk 450.

The spacing portion 470 comprises a sustaining portion 471 sustaining a bearing that is mounted between the carrier 210 and the sustaining portion 471, a fixed disk 472 that is fixed to the hub shaft 410, and a plurality of spacer pins 473 that are fixed to the fixed disk 472 and contact the sustaining portion 471 through an arc groove 454 formed in the transforming disk 450.

The sustaining portion 471 is rotatable, and a passage hole 471a is formed therein, in order not to hinder the rotation of the mediating portion 440.

Figure 8:
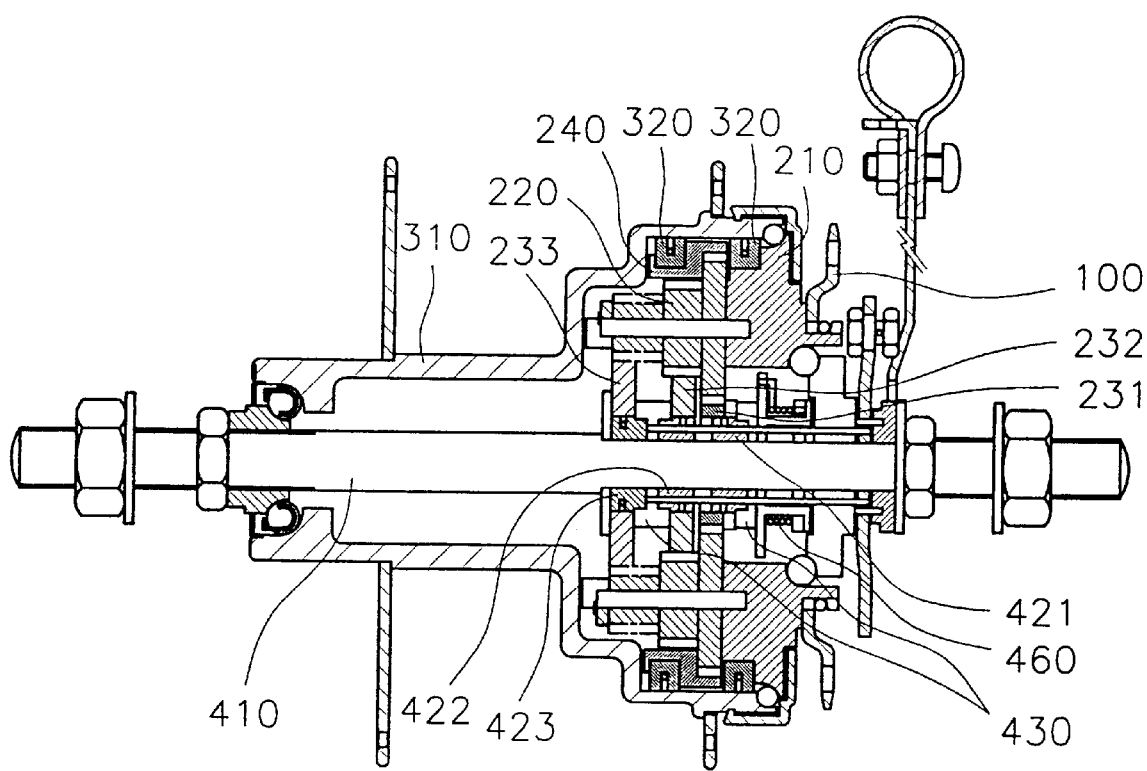
FIG. 8 is a sectional view of the speed changing apparatus of the present invention according to another embodiment.

FIG. 8 shows a section view of the present invention according to another embodiment. Here, the apparatus comprises planetary gears 220 having three steps, three sun gears 231, 232, 233 engaging with each step of the planetary gears 220, and an expanded speed-change controlling portion for controlling the state of speed in four states. Here, with more than two sets of pawls, a plurality of pawl-controlling rings is installed between each set of pawls. However, the other elements are the same as in the previous embodiment, except that the shapes are appropriately changed.

As described above, according to the present invention, the number of speed step levels may readily be increased, because actual control of the speed steps takes place in the pawl-controlling portion. Accordingly, there is hardly any obstacle to increasing the number of speed step levels. Therefore, more than four speed change steps are also possible.

The operation and effect of the apparatus for changing the speed of bicycles, having the above structure, according to the present invention, will now be described.

Hereinafter, three speed step levels, respectively, the low speed state, mid speed state and high speed state, will be described with reference to the first embodiment of the present invention shown in FIGS. 3 to 7 and FIGS. 9A to 9C.

1. Low Speed State

Figure 9A:
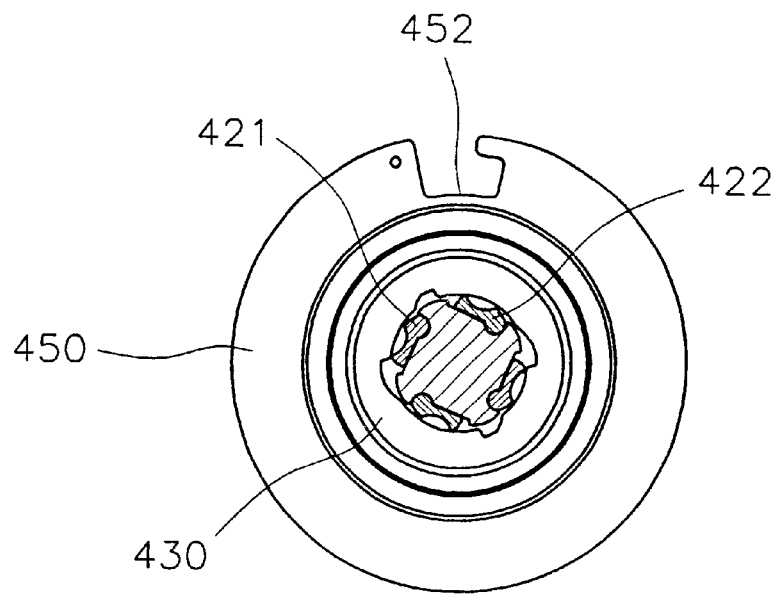
FIG. 9A is a schematic view of the speed-change controlling portion of the present invention in its low speed state.

In the low speed state, as shown in FIG. 9A, both the first and second pawls 421, 422 are outside the grooves 431, 432 of the pawl-controlling ring 430. That is, they are not engaging the first and second sun gears 231, 232.

When the driven sprocket 100 rotates by the rider pedaling the bicycle, the carrier 210 that engages the driven sprocket 100 also rotates. Then the driving force of the carrier 210 is transferred to the hub shell 310 via the clutch means 320.

In this case, while the planetary gears 220, which engage the sun gears 231, 232, rotate with the carrier 210, the planetary gears 220 are idling, because the sun gears 231, 232 are in a free state.

2. Mid Speed State

Figure 9B:
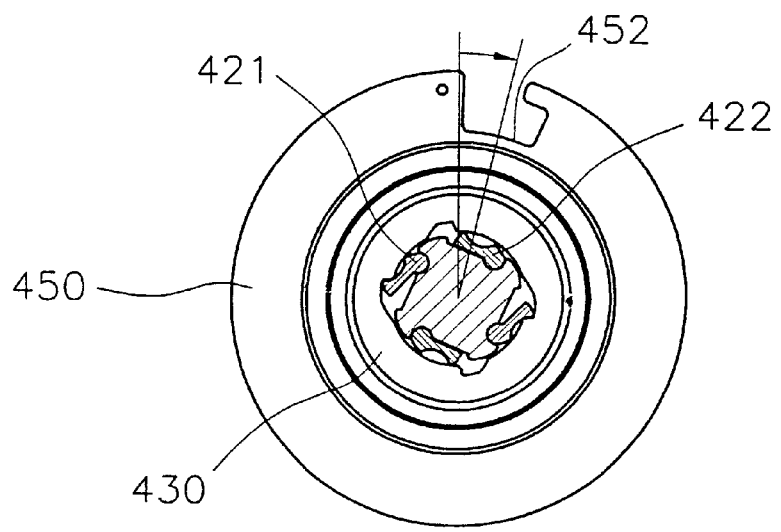
FIG. 9B is a schematic view of the speed-change controlling portion of the present invention in its mid speed state.

In the mid speed state, the speed-change controlling portion is disposed as shown in FIG. 9B. That is, when the rider operates a lever (not shown), the transforming disk 450 rotates a certain degree by being connected with the lever by connection means, such as a wire.

When the transforming disk 450 rotates a certain degree, the pork ring 442, which is connected in the splined portion 453 of the transforming disk 450, rotates, and the pawl-controlling ring 430 also rotates. So the first pawl 421 locates to the sloping groove 431 and protrudes outward. As a result, the first pawl 421 engages the ratchet-teeth 231a of the first sun gear 231. At this time, the second pawl 422 is protruding, but not wholly, which is preferable so that it will be sensitive to the next movement of the pawl-controlling ring 430, and also so that it causes little noise.

In above described mid speed state, when the driven sprocket 100 rotates by the rider pedaling the bicycle, the carrier 210, which engages the driven sprocket 100, also rotates. The planetary gears 220 also rotate, but in this case it is because the tooth portion of a large diameter (i.e., a first step) planetary gear 220 engages the fixed first sun gear 231 by the first pawl 421, causing the planetary gears 220 to rotate faster than the carrier 210.

The speed ratio (calculated by the number of gear teeth) of the mid speed state is as follows in the case where the rotational speed of the carrier 210 is unity:

$$\text{speed ratio} = 1 + \frac{\text{first step of planetary gears}}{\text{ring gear}} \times \frac{\text{first sun gear}}{\text{first step of planetary gears}}$$

$$= 1 + \frac{\text{first sun gear}}{\text{ring gear}}$$

In this embodiment, the speed is about one and a half times that of the low speed state.

As a result, the rotational speed of the ring gear 240, by the rotation of the planetary gears 220, exceeds the speed of the carrier 210, and the clutch means 320 causes only the faster part of the rotation to transfer to the hub shell 310.

3. High Speed State

Figure 9C:
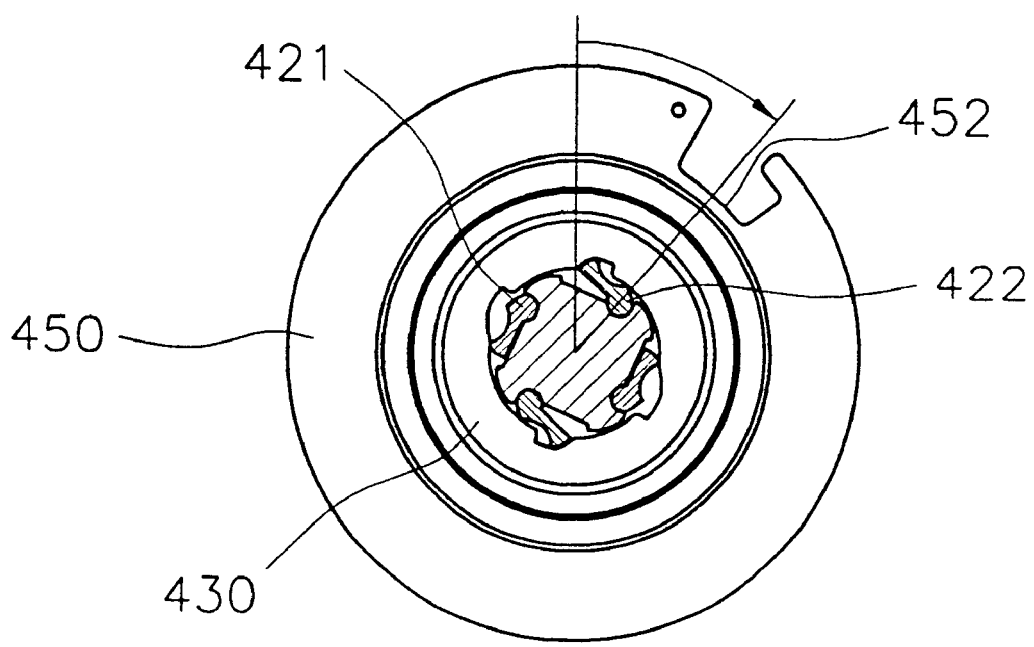
FIG. 9C is a schematic view of the speed-change controlling portion of the present invention in its high speed state.

While in the above mid speed state, the rider may operate a lever to cause the transforming disk 450 to rotate further, as shown in FIG. 9C. This is the high speed state.

When the transforming disk 450 rotates to a certain additional degree, as compared to the mid speed state, the pork ring 442, which is connected in the splined portion 453 of the transforming disk 450, rotates, and the pawl-controlling ring 430 rotates further.

So the first pawl 421 moves toward the inner position of the pawl-positioning portion 411 of the hub shaft 410, and the second pawl 422 is located to the angular groove 432 and protrudes outward. As a result, the second pawl 422 engages the ratchet teeth 232a of the second sun gear 232.

In above described high speed state, when the driven sprocket 100 rotates by the rider pedaling the bicycle, the carrier 210 that engages the driven sprocket 100 also rotates. The planetary gears 220 also rotate, but in this case it is because the tooth portion of a small diameter (i.e., a second step) planetary gear 220 engages the fixed second sun gear 232 by the second pawl 422. The planetary gears 220 rotate faster than the carrier 210, similarly to the mid speed state.

The speed ratio (calculated by the number of gear teeth) of the high speed state is as follows in the case where the rotational speed of the carrier 210 is unity:

$$\text{speed ratio} = 1 + \frac{\text{first step of planetary gears}}{\text{ring gear}} \times \frac{\text{second sun gear}}{\text{second step of planetary gears}}$$

In this embodiment, the speed is about two times that of the low speed state.

As a result, similarly to the mid speed state, the rotational speed of the ring gear 240 by the rotation of the planetary gears 220 exceeds the speed of the carrier 210, and the clutch means 320 causes only the faster part of the rotation to transfer to the hub shell 310.

According to the second embodiment, as described above, three sets of pawls 421, 422, 423 are provided, so higher speed states in addition to the low, mid, and high speed states are possible.

Figure 10:
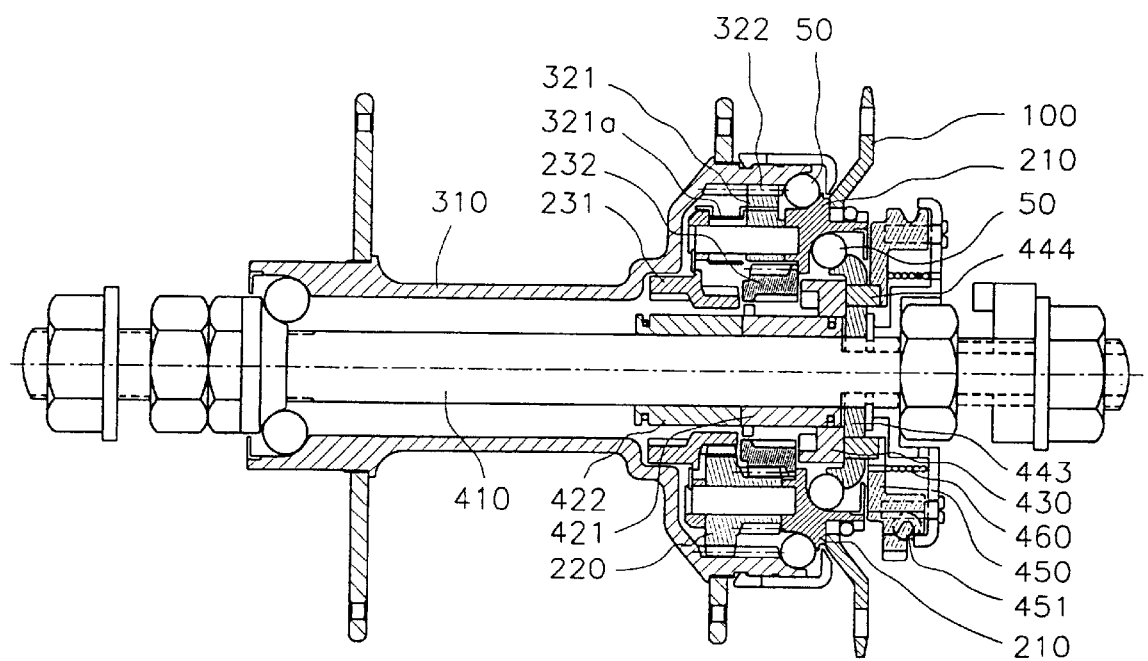
FIG. 10 is a section view of the speed changing apparatus of the present invention according to the third embodiment.

FIG. 10 shows a sectional view of the present invention according to the third embodiment. The entire construction of this embodiment is approximately the same as the previous embodiments.

But the direction of the installation of the planetary gears 220 is opposite to that of the previous embodiment. A first pawl 321 is installed in the space created by the change of direction of the planetary gears 220, and a ring gear portion 322 in the inner circumference of the hub shell 310 is used as the clutch means (320 in FIGS. 3 and 8).

Here, also, a pin 444 fixed on the one side of the pawl-controlling ring 430 is used. The pin 444 is connected to the transforming disk 450 through a disk 443 installed between the pawl-controlling ring 430 and the transforming disk 450. (Also, the disk 443 supports the bearing 50 as shown in FIG. 10.)

The first pawl 321 engages the ring gear portion 322 by the operation of a spring 321a mounted on the shaft of the planetary gears 220.

Therefore, the rotational force of the driven sprocket 100 is transferred to the hub shell 310 by engagement of the first pawl 321 and the ring gear portion 322, regardless of the speed state.

Figure 11:
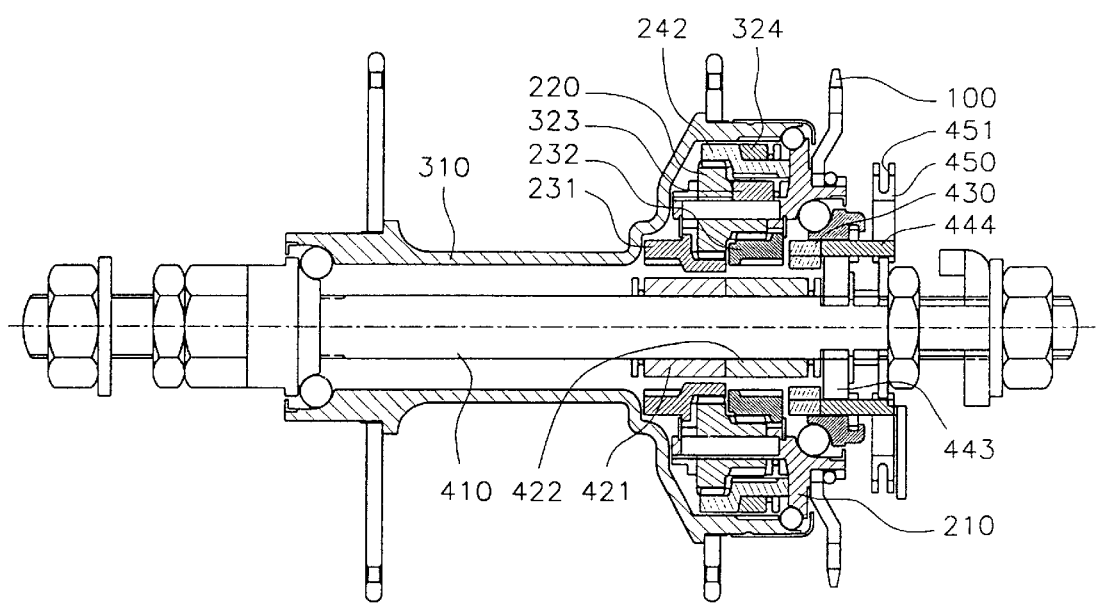
FIG. 11 is a section view of the speed changing apparatus of the present invention according to the fourth embodiment.

FIG. 11 shows a sectional view of the present invention according to the fourth embodiment. In this embodiment, the construction is similar to the third embodiment, in that the direction of the installation of the planetary gears 220 is opposite to that of the first and second embodiments, but a second pawl 323 installed in the space created by the change of the direction of the planetary gears 220 is used as the clutch means 320.

Here, also, a ring gear 242 engaging the planetary gears 220 and the second pawl 323, at the same time, is installed outside of the second pawl 323. A third pawl 324 is installed between the ring gear 242 and the hub shell 310.

Other elements are the same as the third embodiment.

Therefore, in the low speed state, the rotational force of the driven sprocket 100 is transferred to the hub shell 310 by the engagement of the second pawl 323 and the ring gear 242 via the third pawl 324. In the mid speed state and the high speed state, the rotational force of the driven sprocket 100 is transferred to the hub shell 310 by the engagement of the planetary gears 220 via the ring gear 242 and the third pawl 324.

Even in the mid speed state and the high speed state, the second pawl 323 tends to engage the ring gear 242, but actual engagement does not take place because the rotation of the planetary gear 220 is faster than the driven sprocket 100. Many alternations and modifications may be made by those having ordinary skill in the art without departing from the spirit and scope of the invention. Therefore, it must be understood that the illustrated and described embodiments have been set forth only for the purpose of example and that these should not be taken as limiting the invention as defined by the claims which follow.

The words used in this Specification to describe the invention and its various embodiments are to be understood not only in the sense of their commonly defined meanings, but also to include, by special definition in this Specification, structures, materials or acts beyond the scope of the commonly defined meanings. Thus if an element can be understood in the context of this Specification as including more than one meaning, then its use in a claim must be understood as being generic to all possible meanings supported by the Specification and by the word itself.

The definitions of the words or elements of the following claims, therefore, include not only the combination of elements which are literally set forth, but all equivalent structures, materials or acts for performing substantially the same function in substantially the same way to obtain substantially the same result.

Insubstantial departures from the claimed subject matter as viewed by a person with ordinary skill in the art, now known or later devised, are expressly contemplated as being equivalently within the scope of the claims, even though not performing exactly the same function in substantially the same way to obtain substantially the same result. Therefore, substitutions now or later known to one with ordinary skill in the art will be within the scope of the defined elements.

The claims are thus understood to include what is specifically illustrated and described above, what is conceptually equivalent, what can be obviously substituted and also what essentially incorporates the essential idea of the invention.

What is claimed is:

1. An apparatus for changing the speed of a bicycle having a rear driving wheel, the apparatus comprising:
    a driven sprocket for receiving the driving force of a driving sprocket;
    a speed controlling portion, comprising:
        a carrier fixed to one side of the driven sprocket, a plurality of planetary gears within said carrier, each of said planetary gears having at least a first tooth portion and a second tooth portion;
        at least two sun gears, each having ratchet-teeth along its inner circumference, one of said sun gears being engageable with said first tooth portion of each of said planetary gears and a second of said sun gears being engageable with said second tooth portion on each of said planetary gears;
        a ring gear engageable with the planetary gears;
    an output portion, comprising:
        a hub shell for transferring the driving force to the rear wheel of the bicycle by means of the carrier and the ring gear;
        a clutch means, mounted between the carrier and hub shell and the ring gear and the hub shell to selectively mediate the driving force; and
    a speed-change controlling portion, comprising:
        a hub shaft having a pawl-positioning portion;
        at least two sets of pawls engageable with and releasable from the ratchet-teeth of the sun gears;
        a pawl-controlling ring for controlling the position of the pawls;
        a transforming disk having a groove along its outer circumference, and a hooking portion on said outer circumference, said hooking portion adapted to transform the position of the pawl-controlling ring through a mediating portion;
        a spring for restoring the position of the transforming disk to its original position; and
        a spacing portion enabling the transforming disk to rotate freely.

2. The apparatus of claim 1, wherein on the inner surface of the pawl-controlling ring, grooves are positioned symmetrically with respect to the center point.

3. The apparatus of claim 2, wherein the grooves of the pawl-controlling ring are not positioned at a uniform angular interval with respect to the center point of the pawl-controlling ring.

4. The apparatus of claim 2, wherein the grooves comprise a pair of sloping grooves and a pair of angular grooves, the sloping groves alternating with the respective angular grooves.

5. The apparatus of claim 1, wherein the pawls are positioned in the pawl-positioning portion of the hub shaft at a uniform angular interval.

6. The apparatus of claim 1, wherein each of the pawls comprises:

a sag portion positioned inside of the pawl-controlling ring; and a stopper portion engageable with and releasable from the ratchet-teeth at the inner circumference of the sun gear.

7. The apparatus of claim 6, wherein those pawls positioned relatively far from the pawl-controlling ring further comprise an extended portion that is thinner than the pawl bodies.

8. The apparatus of claim 1, wherein the mediating portion comprises:

a splined groove on one side of the pawl-controlling ring;

a connecting portion having a coupling groove, said connecting portion engaging the splined groove; and a pork ring in the coupling groove, mediating the rotational force by engaging a splined portion of the transforming disk.

9. The apparatus of claim 1, wherein the spacing portion comprises:

a sustaining portion sustaining a bear ring, which is mounted between the carrier and the sustaining portion;

a fixed disk that is fixed to the hub shaft; and a plurality of spacer pins that are fixed to the fixed disk and in contact with the sustaining portion through an arc groove in the transforming disk.

10. The apparatus of claim 9, wherein the sustaining portion is rotatable, and a passage hole is provided therein.

11. The apparatus of claim 1, comprising more than two set of pawls, a plurality of pawl-controlling rings provided between each set of pawls.

12. The apparatus of claim 1, wherein the clutch means comprises:

a clutch ring having a group of pins positioned therein; and a sloping portion at the outer circumference of the carrier and the ring gear.

13. The apparatus of claim 1, wherein the clutch means comprises:

a first pawl in the space between the planetary gears; and a ring gear portion at the inner circumference of the hub shell.

14. The apparatus of claim 1, wherein the clutch means comprises:

a second pawl installed in the space between the planetary gears;

a ring gear outside the second pawl simultaneously engaging the planetary gears and the second pawl; and a third pawl between the ring gear and the hub shell.

15. The apparatus of claim 1, wherein the mediating portion comprises:

a pin fixed on one side of the pawl-controlling ring, said pin connected to the transforming disk through a disk positioned between the pawl-controlling ring and the transforming disk.

* * * * *

(12) INTER PARTES REEXAMINATION CERTIFICATE (855th)
United States Patent
Yoo

(10) Number: US 6,478,711 C1
(45) Certificate Issued: Apr. 15, 2014

(54) APPARATUS FOR CHANGING SPEED OF BICYCLES

(75) Inventor: Moon-Soo Yoo, Chungcheongbuk-do (KR)

(73) Assignee: MBI Co., Ltd., Heungduk-Gu, Cheongju-Si, Chungcheongbuk-Do (KR)

Reexamination Request:
No. 95/001,051, Jun. 6, 2008

Reexamination Certificate for:
Patent No.: 6,478,711
Issued: Nov. 12, 2002
Appl. No.: 09/735,770
Filed: Dec. 13, 2000

(30) Foreign Application Priority Data

Dec. 15, 1999 (KR) ...................................... 99-57970

(51) Int. Cl.
*B62M 11/16* (2006.01)
(52) U.S. Cl.
USPC .......................................... 475/289; 475/340
(58) Field of Classification Search
USPC ................................................. 475/289, 340
See application file for complete search history.

(56) References Cited

To view the complete listing of prior art documents cited during the proceeding for Reexamination Control Number 95/001,051, please refer to the USPTO's public Patent Application Information Retrieval (PAIR) system under the Display References tab.

*Primary Examiner* — Matthew C. Graham

(57) ABSTRACT

An apparatus for changing the speed of bicycles, more particularly, an apparatus that changes the speed of bicycles using inner gears within a rear wheel hub and controls the inner gears by means of controllers mounted on a hub shaft. The apparatus includes: a driven sprocket receiving the driving force of a driving sprocket; a speed controlling portion, which includes a carrier that is fixed to one side of the driven sprocket, containing a plurality of planetary gears with ratchet-teeth formed along their inner circumferences; at least two sun gears for engaging each step of the planetary gears at their ratchet-teeth; a ring gear engaging the other side of the planetary gears; an output portion, including a hub shell transferring the driving force to the rear wheel by means of the carrier and the ring gear; a clutch means mounted between the carrier and the hub shell, and the ring gear and the hub shell, which selectively mediates the driving force; and a speed-change controlling portion. The speed-change controlling portion includes: a hub shaft having a pawl-positioning portion; at least two sets of pawls which engage with or release from the ratchet-teeth of the two or more sun gears; a pawl-controlling ring that controls the position of the two or more sets of pawls; a transforming disk having a groove along its outer circumference with a hooking portion at a certain position thereon, in order to transform the position of the pawl-controlling ring via a mediating portion; a spring for restoring the position of the transforming disk to its original position; and a spacing portion enabling the transforming disk to rotate freely.

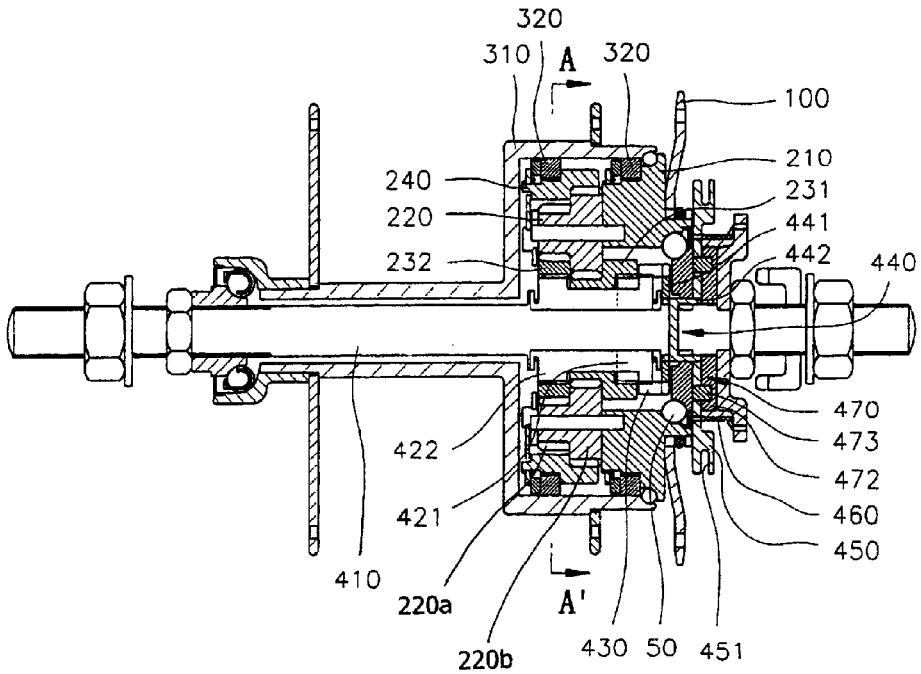

US 6,478,711 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6 and 11-15 is confirmed.

Claim 7 is cancelled.

Claim 8 is determined to be patentable as amended.

New claims 16-24 are added and determined to be patentable.

Claims 9 and 10 were not reexamined.

8. The apparatus of claim 1, wherein the mediating portion comprises:
  a splined groove on one side of the pawl-controlling ring;
  a connecting portion having a coupling groove, said connecting portion engaging the splined groove; and
  a [pork] *fork* ring in the coupling groove, mediating the rotational force by engaging a splined portion of the transforming disk.

16. *The apparatus of claim 1, wherein the pawl-controlling ring is disposed at a location axially displaced from the at least two sun gears with respect to a longitudinal axis of the hub shaft.*

17. *The apparatus of claim 1, wherein the position of the pawl-controlling ring along a longitudinal axis of the hub shaft does not overlap with the positions of the at least two sun gears along said longitudinal axis.*

18. *The apparatus of claim 1, wherein the axial width of the pawl-controlling ring is less than the diameter of the pawl-controlling ring.*

19. *The apparatus of claim 6, wherein the sag portion of each of the pawls is disposed at a location axially displaced from the at least two sun gears with respect to a longitudinal axis of the hub shaft.*

20. *The apparatus of claim 6, wherein the sag portions of the at least two sets of pawls are disposed at a common axial position along the hub shaft.*

21. *An apparatus for changing the speed of a bicycle having a rear driving wheel, the apparatus comprising:*
  *a driven sprocket for receiving the driving force of a driving sprocket;*
  *a speed controlling portion, comprising:*
    *a carrier fixed to one side of the driven sprocket, a plurality of planetary gears within said carrier, each of said planetary gears having at least a first tooth portion and a second tooth portion;*
    *at least two sun gears, each having ratchet-teeth along its inner circumference, one of said sun gears being engageable with said first tooth portion of each of said planetary gears and a second of said sun gears being engageable with said second tooth portion on each of said planetary gears;*
    *a ring gear engageable with the planetary gears;*
  *an output portion, comprising:*
    *a hub shell for transferring the driving force to the rear wheel of the bicycle by means of the carrier and the ring gear;*
    *a clutch means, mounted between the carrier and hub shell and the ring gear and the hub shell to selectively mediate the driving force; and*
  *a speed-change controlling portion, comprising:*
    *a hub shaft having a pawl-positioning portion;*
    *at least two sets of pawls engageable with and releasable from the ratchet-teeth of the sun gears;*
    *a pawl-controlling ring for controlling the position of the pawls;*
    *a transforming disk having a groove along its outer circumference, and a hooking portion on said outer circumference, said hooking portion adapted to transform the position of the pawl-controlling ring through a mediating portion;*
    *a spring for restoring the position of the transforming disk to its original position; and*
    *a spacing portion enabling the transforming disk to rotate freely;*
  *wherein each of the pawls comprises: a sag portion positioned inside of the pawl-controlling ring; and a stopper portion engageable with and releasable from the ratchet-teeth at the inner circumference of the sun gear;*
  *wherein those pawls having stopper portions positioned relatively far from the pawl-controlling ring each further comprise an extended portion that is thinner than the pawl bodies;*
  *the extended portion of at least one of those pawls having a stopper portion positioned relatively far from the pawl-controlling ring extends through a sun gear of the at least two sun gears; and*
  *the stopper portion of said at least one of those pawls is engageable with the ratchet-teeth of another sun gear of the at least two sun gears; and*
  *wherein those pawls having stopper portions positioned relatively near to the pawl-controlling ring are engageable with and releasable from the ratchet-teeth of one of the at least two sun gears positioned relatively near to the pawl-controlling ring;*
  *those pawls having stopper portions positioned relatively far from the pawl-controlling ring are engageable with and releasable from the ratchet-teeth of one of the at least two sun gears positioned relatively far from the pawl-controlling ring;*
  *the extended portion of those pawls having stopper portions positioned relatively far from the pawl-controlling ring extend through sun gear positioned relatively near to the pawl-controlling ring and connect the stopper portions with the respective sag portions; and*
  *the engagement and release of those pawls having stopper portions positioned relatively far from the pawl controlling ring with the sun gear positioned relatively far from the pawl-controlling ring does not interfere with the rotation of the sun gear positioned relatively near to the pawl-controlling ring.*

22. *The apparatus of claim 1, wherein each of the pawls comprises:*
  *a teeth-engaging portion adapted to be selectively engageable with the ratchet-teeth of an associated one of the sun gears and disposed within an annulus defined between the hub shaft and the inner circumference of the associated sun gear, and*
  *a ring-engaging portion adapted to be engageable with the pawl-controlling ring and disposed within an annulus*

*defined between the hub shaft and an inner circumference of the pawl-controlling ring, and wherein the ring-engaging portion extends axially beyond the annulus defined between the hub shaft and the inner circumference of the associated sun gear.*

23. *The apparatus of claim 6, wherein the axial width of the pawl-controlling ring is substantially equal to the width of the sag portion of each pawl.*

24. *The apparatus of claim 1, wherein the inner circumferences of the at least two sun gears do not contact any portion of the pawl-controlling ring.*

\* \* \* \* \*